(12) United States Patent
Nicholl et al.

(10) Patent No.: US 7,568,409 B2
(45) Date of Patent: Aug. 4, 2009

(54) HYBRID ORBITING SPINDLE FOR SHAPING NON-CIRCULAR HOLES

(75) Inventors: Robert John Nicholl, Pickney, MI (US); Myron Jeffery Schmenk, Labertville, MI (US)

(73) Assignee: Federal-Mogul World Wide, Inc, Southfield, MI (US)

( * ) Notice: Subject to any disclaimer, the term of this patent is extended or adjusted under 35 U.S.C. 154(b) by 525 days.

(21) Appl. No.: 11/391,879

(22) Filed: Mar. 29, 2006

(65) Prior Publication Data
US 2006/0219066 A1    Oct. 5, 2006

Related U.S. Application Data

(60) Provisional application No. 60/666,674, filed on Mar. 30, 2005.

(51) Int. Cl.
B23B 3/00    (2006.01)
H02K 7/09    (2006.01)
(52) U.S. Cl. .................. 82/1.11; 82/157; 310/90.5
(58) Field of Classification Search .................. 407/48, 407/40, 53, 103, 33, 34, 64; 82/1.11, 157, 82/158, 904; 310/90.5; 408/147; 409/231, 409/186, 193
See application file for complete search history.

(56) References Cited

U.S. PATENT DOCUMENTS

| | | | |
|---|---|---|---|
| 2,684,272 A | 7/1954 | Annen | |
| 2,746,299 A * | 5/1956 | Zimmern et al. | 73/461 |
| 3,154,973 A * | 11/1964 | Hack | 408/2 |
| 3,237,486 A * | 3/1966 | Lynford et al. | 408/3 |
| 3,682,518 A | 8/1972 | Rabenhorst | |
| 4,180,946 A | 1/1980 | Heinjkenskjold et al. | |
| 4,371,218 A * | 2/1983 | Ichikawa | 310/90.5 |
| 4,573,380 A * | 3/1986 | Bald | 82/142 |
| 4,681,492 A | 7/1987 | Hasegawa et al. | |
| 4,690,020 A * | 9/1987 | Sasano et al. | 82/122 |
| 4,827,169 A | 5/1989 | Habermann | |
| 4,884,899 A | 12/1989 | Schwartzman | |
| 4,928,561 A * | 5/1990 | Fouche | 82/1.11 |
| 5,020,968 A | 6/1991 | Yamada et al. | |
| 5,115,702 A * | 5/1992 | Link | 82/126 |
| 5,674,032 A | 10/1997 | Slocum et al. | |
| 5,682,071 A | 10/1997 | Buhler et al. | |
| 6,036,413 A | 3/2000 | Chandrasekar | |
| 6,508,614 B1 | 1/2003 | Ozaki et al. | |
| 6,585,462 B1 * | 7/2003 | Goransson | 409/231 |

FOREIGN PATENT DOCUMENTS

| | | |
|---|---|---|
| JP | 61152304 A | 7/1986 |
| WO | WO 03/071144 A1 | 8/2003 |

* cited by examiner

*Primary Examiner*—Willmon Fridie
(74) *Attorney, Agent, or Firm*—Robert L. Stearns; Dickinson Wright, PLLC (57) ABSTRACT

A machine tool assembly includes a high speed rotating spindle for forming extremely precise surface contours on a work piece. The spindle is supported on a spherical air bearing about its center of gravity. The spindle can be rotated through an air turbine drive system incorporated into the spherical air bearing to eliminate any undesirable moments about an axis perpendicular to the long spindle axis. The spindle is adjustable in pitch and yaw directions through the influence of X-Y actuators. The X-Y actuation system is preferably electromagnetic and provides a non-contact method of displacing the spindle shaft in a controlled manner at any speed.

21 Claims, 6 Drawing Sheets

HYBRID ORBITING SPINDLE FOR SHAPING NON-CIRCULAR HOLES

CROSS-REFERENCE TO RELATED APPLICATIONS

This application claims priority to U.S. Provisional Application Ser. No. 60/666,674 filed Mar. 30, 2005.

BACKGROUND OF THE INVENTION

1. Technical Field

This invention relates generally to high-speed spindle assemblies for shaping a non-circular hole in a work piece.

2. Related Art

Some production applications require the formation of non-circular holes. For example, in the manufacture of pistons for an internal combustion engine, the so-called pin holes formed for the wrist, or gudgeon, pin often have a slight trumpet shape opening toward the center for accommodating flex in the wrist pin. Additionally, this trumpet shape of the pin hole is optimally designed with a slight ovality to further account for distortion in the wrist pin as the piston moves through its various cycles. This trumpet shape and non-circular cross section of the pin hole must be formed to exacting tolerances. For example, tolerances in the range of 3 to 5 microns are often required for these types of applications.

There are industrial methods for creating such non-circular holes to exacting tolerance specifications, including hydraulically actuated milling tools and electro-chemical machining techniques. The prior art has also suggested boring non-circular shapes using a special machine tool spindle equipped with active magnetic bearings. Active magnetic bearings act upon the principle that the rotating spindle is formed of, or with, a ferromagnetic material that is supported in a magnetic field generated by an electromagnet stator. A control system, with appropriate power amplifiers, modulates the magnetic field to maintain the spindle in the desired radial position while it rotates. This radial position can be maintained even under changing load conditions.

While active magnetic bearing systems provide exceptional spindle mobility, they can be expensive to produce and difficult to control. In order to achieve high-dynamic performance and acceptable levels of tool acceleration, it is necessary to provide very large, powerful magnetic bearing actuators. Furthermore, active magnet bearing systems can be difficult to dampen properly in some cutting conditions and if not properly sized and controlled.

SUMMARY OF THE INVENTION

According to the subject invention, a machine tool assembly of the type having a pitch-and-yaw adjusting spindle is provided for forming high precision surface contours on a work piece. The assembly comprises a spindle defining a long axis and having a shaping tool extending from one end thereof. The spindle includes a bearing journal. A journal box at least partially envelopes the bearing journal for rotatably supporting the spindle. A drive motor operatively interacts with the spindle for forcibly rotating the spindle about its long axis. At least one X-Y actuator is provided for controlling pitch and yaw of the spindle to move the shaping tool in a non-circular orbital path. The bearing journal and the journal box have concentric, generally spherically opposing surfaces centered about a center point intersecting the long axis of the spindle.

According to another aspect of the subject invention, a method is provided for magnetically manipulating a high speed spindle assembly for forming an irregular hole with a dimensionally varying axial trajectory in a work piece. The method comprises the steps of affixing a radially extending shaping tool to one end of a spindle having a long axis, supporting the spindle for rotation about the long axis, rotating the spindle about the long axis, creating a magnetic field that influences at least part of the rotating spindle, and adjusting the yaw and pitch angulations of the long axis during rotation of the spindle by manipulating the magnetic field to thereby move the shaping tool in a predetermined, non-circular orbital path. The step of supporting the spindle for rotation about the long axis further includes confining the spindle in a spherical bearing centered about a center point intersecting the long axis of the spindle.

The subject invention therefore comprises a hybrid between the prior art active magnetic bearing systems and the prior art fixed bearing designs that allows free form holes to be machined and provides a cost benefit and improved performance over the prior art systems. The subject orbiting spindle is based, preferably, on a spherical air bearing that allows an X Y actuator system to introduce off-center motions in the spindle about its center of gravity. This provides a cost advantage over electromagnetic bearings as electromagnetic spindles have typically 10 axes to control. However, the subject hybrid orbiting spindle has only two axes to control, yet it is capable of producing substantially the same motions.

The subject invention allows the spindle to rotate about its axis and to also pitch and yaw in a highly controlled manner. The spherical bearing's center of rotation may be placed at the center of gravity for the spindle to insure that the mass of the spindle is reacted by the air bearing and not by the X Y actuation system, thus providing more dynamic force capabilities for following complex precise orbits. The pitch and yaw of the spindle can be controlled with respect to its rotational position. By changing the X Y actuator position, the tool tip of the spindle can be orbited to produce any free form shape.

In the preferred embodiment, the electromagnetic X Y actuation system provides a non-contact method of displacing the spindle shaft at any speed. There are several methods of providing the rotation to the spindle, including an air turbine, an electric motor, or a non-contact rotary coupling, to name a few. In the example of the air turbine embodiment, the air turbine may be incorporated into the spherical air bearing and thus eliminate any moment about the axis perpendicular to the spindle long axis. If an air turbine is used, the mass of the spindle can be reduced, thereby allowing for better profile performance and better acceleration time to achieve the desired rotational velocity. Displacement sensors provide feedback for the position of the X-Y actuation system and allow the orbit to be measured.

The hole forming assembly of this invention overcomes the disadvantages and shortcomings of the prior art by expanding the available range of hole shapes and configurations, particularly in a three-dimensional sense, which can be formed with great accuracy at high speeds.

BRIEF DESCRIPTION OF THE DRAWINGS

These and other features and advantages of the present invention will become more readily appreciated when considered in connection with the following detailed description and appended drawings, wherein.

DETAILED DESCRIPTION OF THE PREFERRED EMBODIMENT

Figure 1:
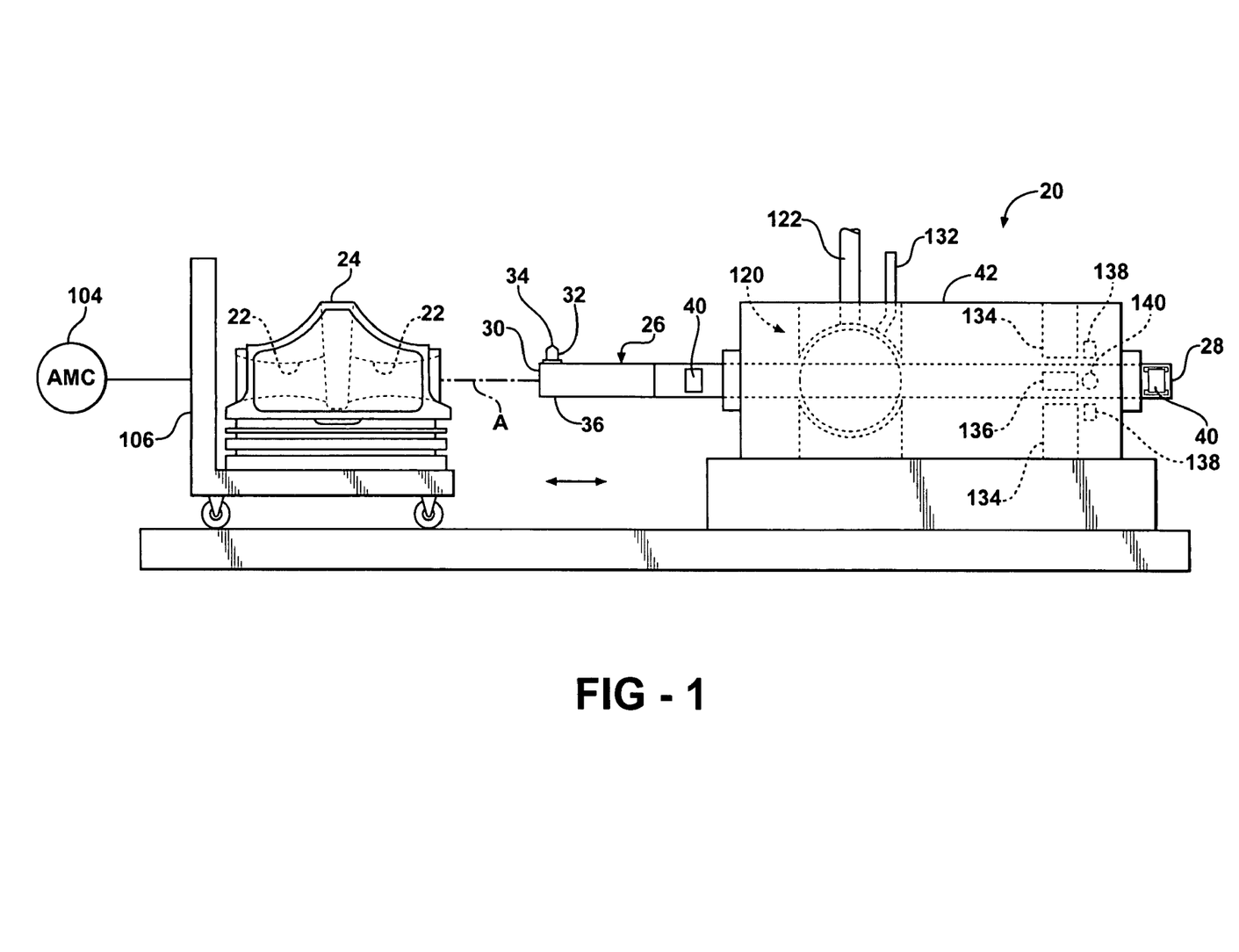
FIG. 1 is a simplified front elevation of a spindle assembly according to the subject invention and an exemplary piston work piece prepared for a hole forming operation.
Figure 2:
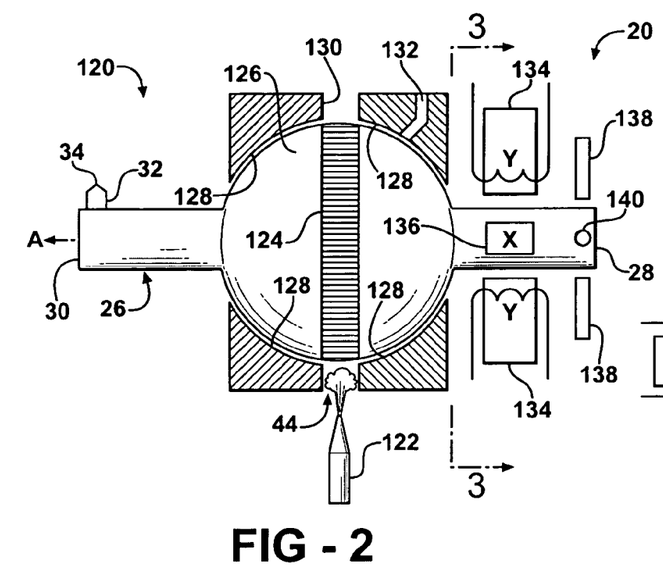
FIG. 2 is a simplified cross-section of an orbiting spindle assembly according to the subject invention.
Figure 3:
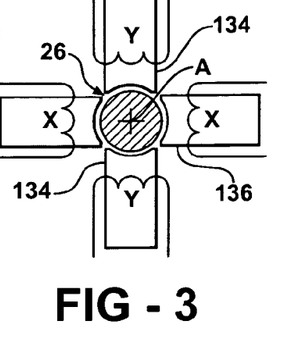
FIG. 3 is a cross-sectional view taken along lines 3-3 of FIG. 2 depicting the X-Y actuation system.

Referring to the Figures, wherein like numbers indicate like or corresponding parts throughout the several views, a high-speed spindle assembly is generally shown at 20 in FIGS. 1 and 2. The spindle assembly 20 is of the type for forming non-circular holes 22 in a work piece 24. In FIG. 1, the work piece 24 is shown for purposes of example only comprising a piston for an internal combustion engine. The non-circular hole 22 is illustrated as the pin hole for containing the so-called wrist pin (not shown). The work piece 24, however, may comprise any component and is not limited to pistons, engines or even automotive applications. Rather, any field of endeavor in which a non-circular hole 22 of high precision tolerance may benefit from the subject invention.

The assembly 20 includes a rigid shaft-like spindle, generally indicated at 26, extending along an long axis A between a rear end 28 and a shaping end 30. A shaping tool 32 extends radially outwardly from the spindle 26 adjacent it's shaping end 30, and terminates in a cutting edge 34. The point-like shape of the cutting edge 34 is an exemplary depiction only, however, as the actual cutting edge 34 of the shaping tool 32 could comprise a removable carbide (or other material) tip of any commercially available shape. In another variation, the shaping tool 32 may be held in a removable tool holder which is secured to the spindle 26 via a taper and bolt arrangement. The spindle 26 is provided with wrench flats 40 adjacent its rear 28 and shaping 30 ends to facilitate removal of the shaping tool 32 for maintenance and tool holder 36 interchanges.

The assembly 20 further includes a housing 42 through which the rear 28 and shaping 30 ends of the spindle 26 extend. The spindle 26 is rotatably supported in the housing 42 by a spherical air bearing assembly, generally indicated at 120. The spherical bearing assembly 120 includes an enlarged, spherical bearing journal 126 attached to the spindle 26, preferably coincident with the center of gravity of the rotating spindle assembly. In any event, the center of the spherical surface which forms the bearing journal 126 lies along the long axis A. The bearing journal 126 is contained within a journal box taking the form of spherical bearing cups 128. Pressurized air is pumped into the interface between bearing journal 126 and the journal box 128 to levitate the spindle 26 for high-speed rotation, e.g., on the order of 100,000 RPM.

Bearing air is introduced to the interface between individual bearing cups in the journal box 128 and the bearing journal 126 through one or more inlets 132 as shown in FIGS. 1 through 5. While discrete inlets 132 are illustrated, acceptable results can be achieved by the use of porous ceramic bearing cups. In this configuration, air permeates through the bearing cups to levitate the journal bearing 126. Another example of air introduction for the bearing feature includes the use of hydrostatic pockets, or depressions, formed in the surface of the journal box 128 into which air from the inlets 132 is directed. Regardless of the method used to introduce air to the interface between the bearing journal 126 and the journal box 128, the spindle 26 is supported by a cushion of air within the spherical bearing assembly 120 and allowed to wobble as it rotates at high speeds.

Figure 7:
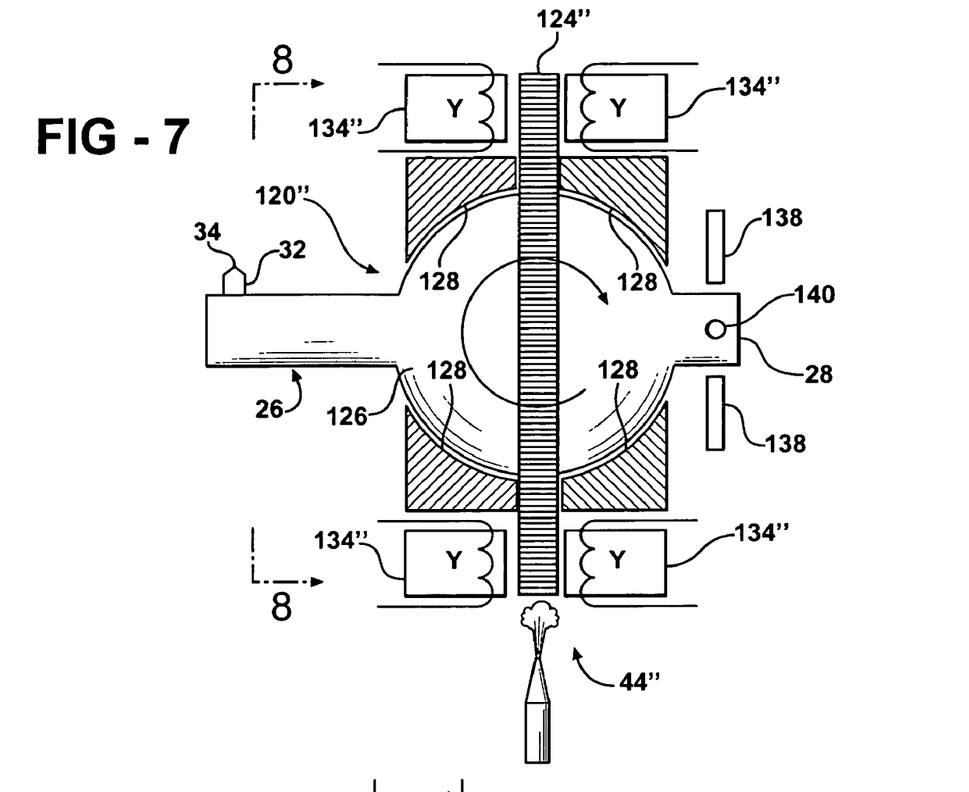
FIG. 7 is an alternative view of the assembly wherein the X-Y actuator system is incorporated into the air turbine drive system.

A drive motor, generally indicated at 44, is disposed within or outside of the housing 42 and operates to forcibly rotate the spindle 26 about its long axis A. The drive motor 44 may be of any known variety, operating on either AC or DC current, fluid, air or any other type of energy source. In the examples shown, the drive motor 44 comprises an air turbine. A turbine air inlet 122 directs a controlled stream of pressured air at an impeller 124. The impeller 124 can be integrally formed about the equator of the spherical bearing journal 126 as shown in FIGS. 2 and 7. When the air turbine is integrated into the bearing journal 126, undesirable moments are eliminated to help stabilize spindle rotation at high speed. Pressurized air flowing through the inlet 122 acts upon the impeller 124 and causes the spindle 26 to rotate within the housing 42 about the long axis A. Air is exhausted from any convenient location, such as via outlet 130 shown in FIG. 2.

Figure 4:
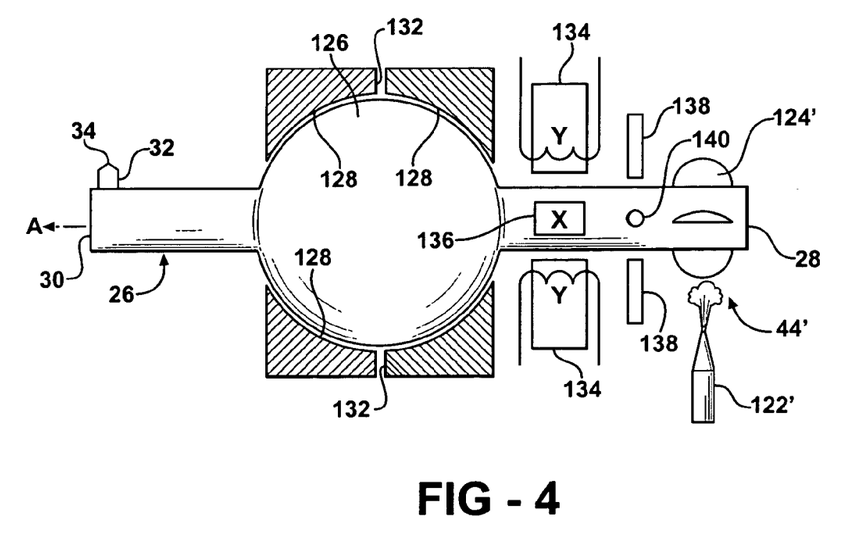
FIG. 4 is an alternative view of the spindle assembly wherein the drive motor is spaced from the center of gravity.

FIG. 4 illustrates an alternative drive motor arrangement, generally indicated at 44'. Here, an air turbine assembly having an inlet 122' acts upon the impeller 124' which is formed about the spindle 26 at a location remote from the spherical bearing assembly 120 and remote from the center of gravity of the spindle. In this example, the hybrid orbiting spindle assembly 20 functions in the same manner, however, the drive mechanism for rotating the spindle 26 at high speeds is different. Those skilled in the art will appreciate other arrangements for the drive motor, which may include an electric motor or other devices.

Referring again to FIGS. 1 through 5, the assembly 20 is shown including a pair of Y-axis actuators 134 positioned on opposing sides of the spindle 26 at a distance from the spherical bearing assembly 120. Similarly, X-axis actuators 136, oriented perpendicular to the Y-axis actuators 134, are also positioned on opposite sides of the spindle 26. These actuators 134, 136 are oriented in a common plane and can be selectively energized through an appropriate control mechanism to urge the spindle 26 with an electromagnetic attractive force. By intentionally and variably energizing the actuators 134, 136, acting like moment arms, the shaping tool 34 can be forced to move in a controlled path, either circular or non-circular. Although the figure suggests that the Y-axis actuators 134 are located in a generally vertical plane, whereas the X-axis actuators 136 are located in generally horizontal plane, this is not necessary. In some cases, it may be desirable to orient the respective axes at an approximate 45 degree angle relative to the horizontal. Also, although four actuators 134, 136 are shown, it is possible to accomplish the desired articulation of the shaping tool 34 using three actuators spaced in generally equal arcuate increments around the long axis A.

Position sensors 138, 140 are associated with the Y-axis actuators 134 and X-axis actuators 136, respectively. The position sensors 138, 140 operate by feeding information about the position of the spindle 26 in the form of an electrical voltage. Normally, these position sensors 138, 140 are calibrated so that when the spindle 26 is in a neutral position, the sensor produces a null voltage. When the spindle 26 moves above the neutral position, a positive voltage is produced. When the spindle 26 moves below the neutral position, a negative voltage results.

A controller (not shown) independently controls each of the actuators 134, 136 to adjust the radial position of the spindle 26 as it is levitated on a cushion of air within the spherical bearing assembly 120. By controlling the spindle 26 position through the actuators 134, 136, the shaping end 30 can be articulated and caused to scribe a highly controlled, non-circular orbital path. The controller may be of the centralized type coordinating inputs from all of the sensors 138, 140 and issuing outputs to all of actuators 134, 136 to achieve the desired articulation of the shaping end 30. Alternatively, the controller may include separate components independently controlling for the X-axis and the Y-axis. In this latter configuration, one controller for the X-axis actuators 136 would receive voltage signals from the X position sensors 140, process this information with a mathematical model including dimensional relationships such as axial distance to the cutting edge 34 and the tool radius measured from long axis A to the cutting edge 34, and send current (or voltage) requests to an integrated or stand-alone amplifier. Thus, the controller would receive multiple inputs, i.e., inputs from every sensor in the X-plane, and issue multiple outputs to all of the actuators 136 in the X-plane to dynamically control the spindle 26.

The X-axis controller may include anti-aliasing filters, analog-to-digital converters, a digital signal processor, and pulse-width modulation generators. Voltage from the position sensors 136 would be passed through the anti-aliasing filters to eliminate high frequency noise from the signal. After the high frequency content is removed, the position signal is sampled by an analog-to-digital converter which converts the voltage signal to a form that can be processed by a digital signal processor. The digital information is then passed through a digital filter and produces an output proportional to the amount of current (or voltage) required to correct or adjust the position of the spindle 26 according to a predetermined value. The requested current is compared to the actual current supplied to the actuators 136, which is also sent, filtered, and sampled with an analog-to-digital converter. The error between the actual and requested current is used to characterize the pulse-width modulation signal sent to the amplifiers. This information is then sent to the pulse-width modulation generators which creates the pulse-width modulation wave forms sent to the amplifiers. The Y-axis controller would work in a similar fashion receiving multiple input signals from the Y-position sensors 138 and issuing multiple corrective actions via outputs to the Y-axis actuators 134. A detailed description of a suitable control system may be found in U.S. Ser. No. 11/065,618 filed Feb. 24, 2005 and assigned to the assignee of the subject application, the entire disclosure of which is hereby incorporated by reference.

A rotary position sensor (not shown), in the form of a rotary encoder, would be incorporated into the assembly 20 for determining the angular position of the spindle 26, and thus the angular position of the shaping tool 32 about the long axis A. The rotary encoder would communicate with the controller(s) to enable coordinated adjustments of the actuators 134, 136.

An axial motion controller is schematically represented at 104 in FIG. 1. The axial motion controller 104 moves the shaping tool 32 relative to the work piece 24 in directions generally parallel with the long axis A while the shaping tool 32 simultaneously forms the non-circular hole 22. At the same time, the X-Y controllers manipulate the actuators 134, 136, thus dimensionally varying the axial trajectory of the hole 22 in the work piece 24. The axial motion controller 104 can operate by holding the work piece 24 stationary and translating the spindle assembly 20, or as shown in FIG. 1 may include a work piece holder 106 which is moved relative to a stationary spindle assembly 20. Alternatively, both components can be moved at the same time relative to a fixed point of reference.

Figure 5:
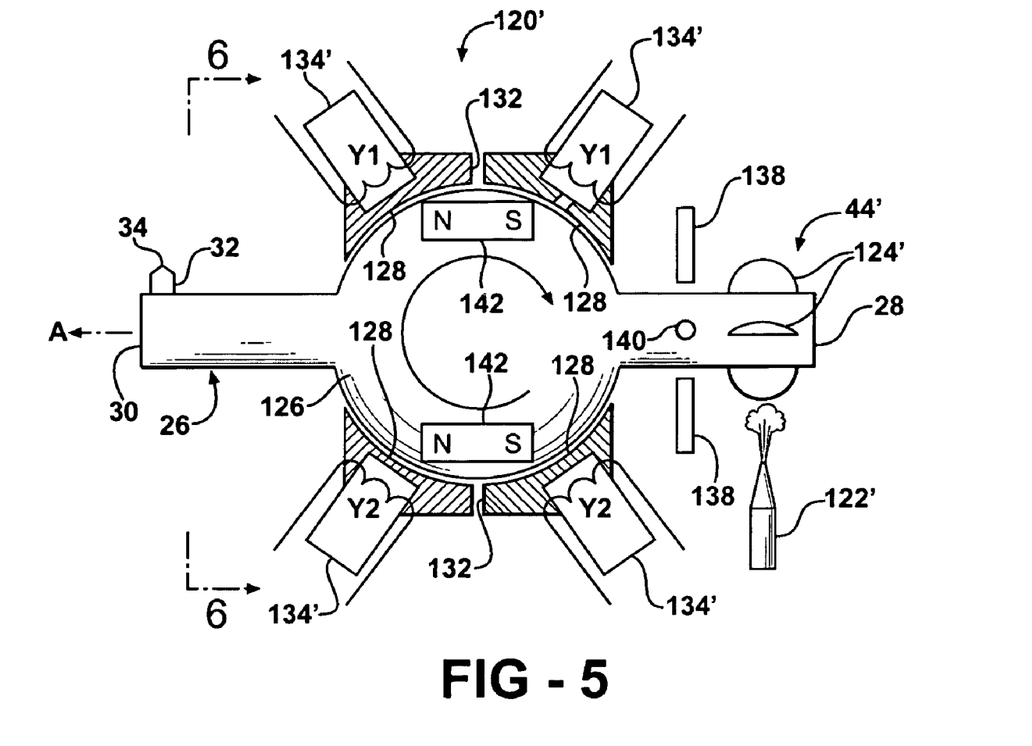
FIG. 5 is an alternative view of the spindle assembly wherein the X-Y actuator system is incorporated into the spherical air bearing.
Figure 6:
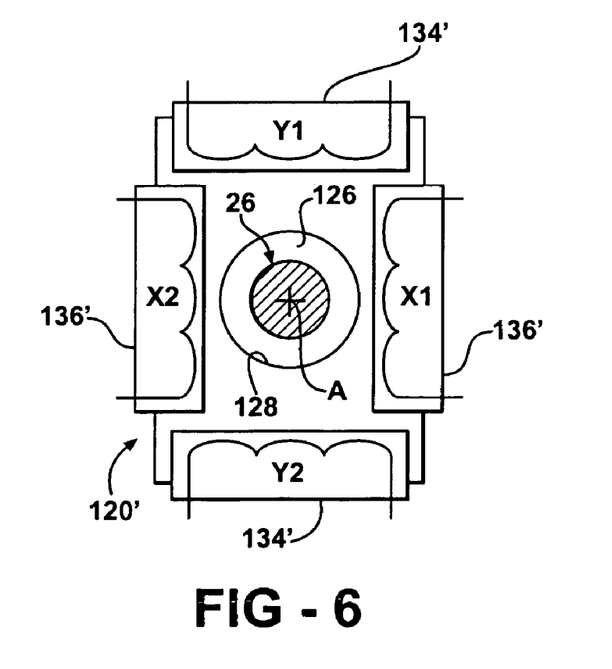
FIG. 6 is a cross-section taken along lines 6-6 of FIG. 5 showing a companion X-Y actuation system.

FIGS. 5 and 6 illustrate an alternative configuration of the actuators 134', 136' wherein they are integrated into the spherical bearing assembly 120. These integrated actuators 134', 136' are responsive to a permanent ring magnet 142 (or steel ring) embedded in the bearing journal 126. The actuators 134', 136' thus introduce torques within the bearing journal 126 at precisely controlled times and in precisely controlled amounts to accomplish a predetermined orbital path in the cutting tool 32.

Figure 8:
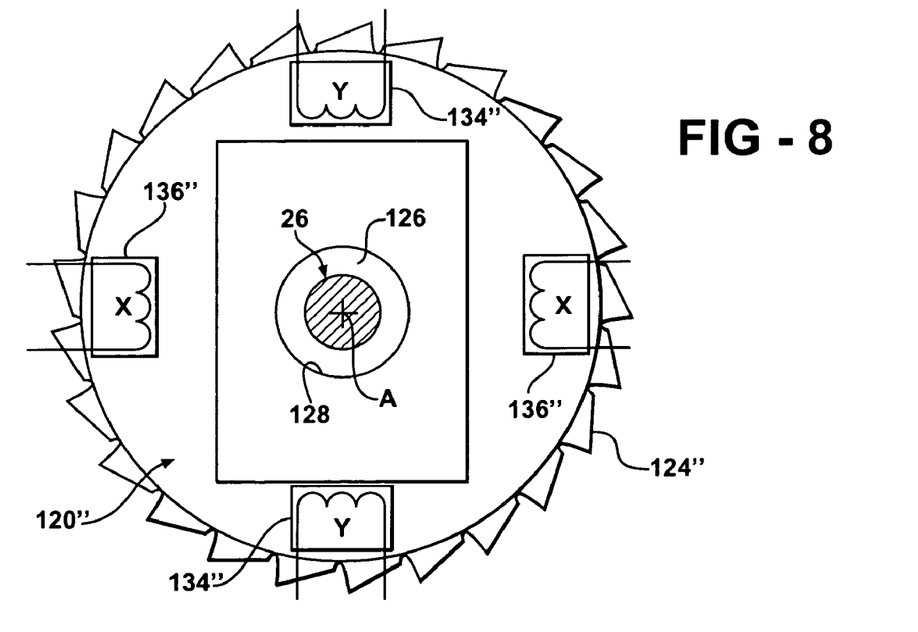
FIG. 8 is a cross-section along lines 8-8 of FIG. 7.

FIGS. 7 and 8 illustrate yet another variation of the actuators 134", 136" wherein the air turbine 124" is enlarged and formed of a magnetically reactive material. Here, the X-Y actuators 134", 136" are arranged on opposing sides of the rim-like turbine 124" and react therewith to introduce controlled wobble in the spindle 26. Those skilled in the art will likewise appreciate other alternative configurations of the actuator and drive motor features.

Figure 9:
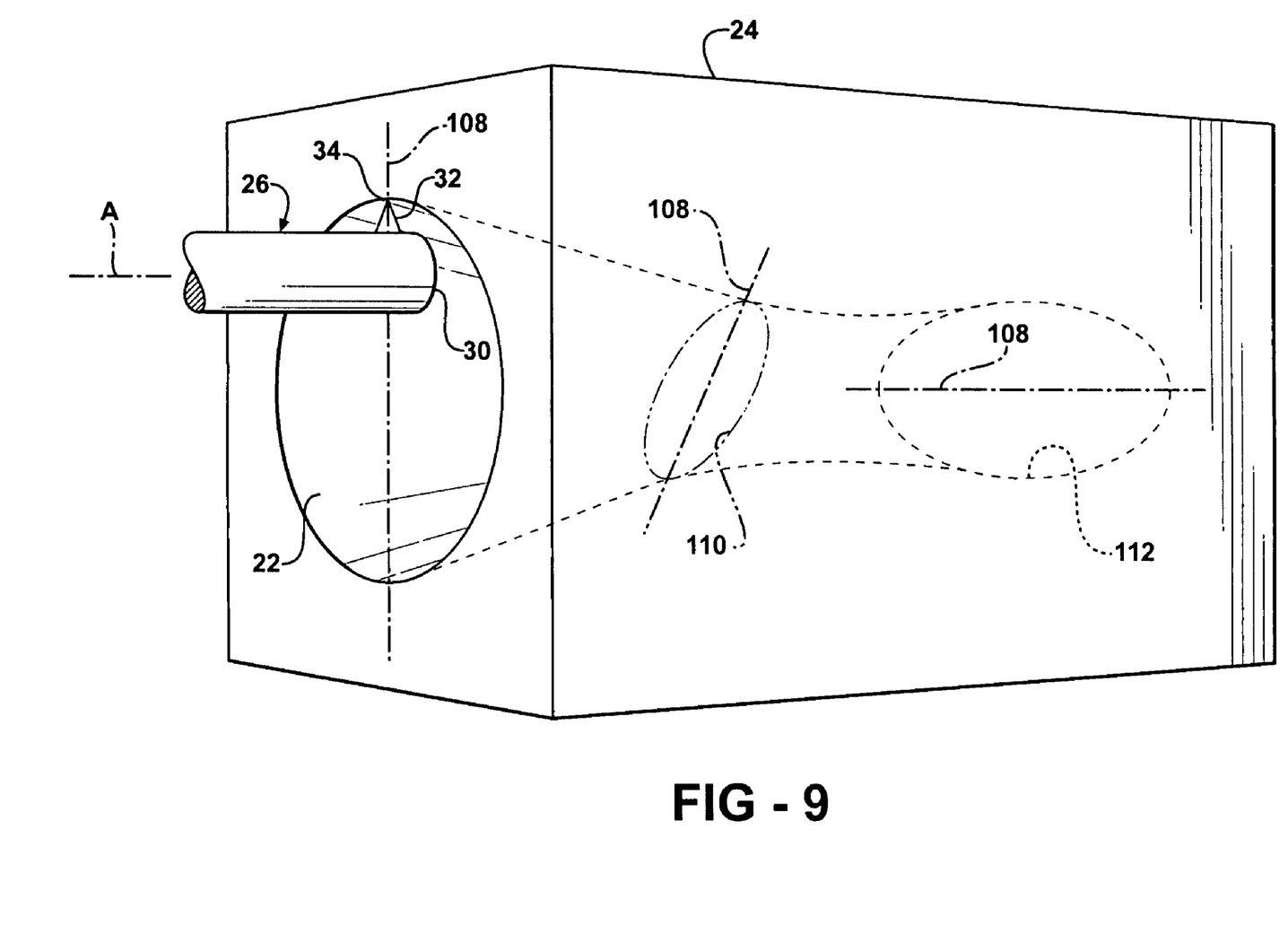
FIG. 9 is a simplified perspective view illustrating an exemplary hole geometry in a work piece in which a continuously axially varying trajectory is created by the shaping tool.
Figure 10:
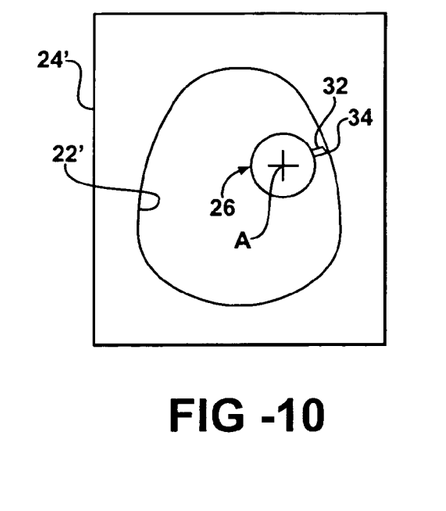
FIGS. 10 and 11 illustrate exemplary non-circular hole geometries, each having an irregular load configuration of which the subject invention is capable of producing.
Figure 11:
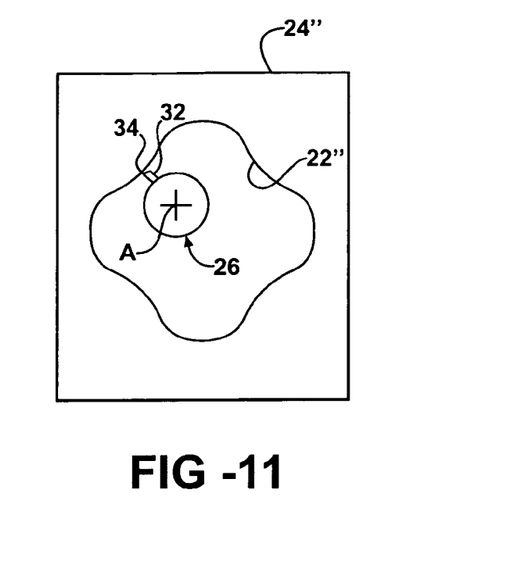

This combination of axial, or longitudinal, movement coupled with a continuously varying orbital path enables creation of geometrically complex shapes such as that depicted in FIG. 9. Here, an exaggerated hole 22 is shown having a generally elliptical profile at the opening of the work piece 24, wherein the ellipse has a generally vertical major axis 108. As the hole 22 extends deeper into the work piece 24, the size of the ellipse reduces, while the major axis 108 is rotated in a clockwise direction. This is represented by the phantom elliptical cross-section at the midpoint 110. As the hole 22 continues deeper into the work piece 24, the shape of the hole 22 enlarges while the major axis 108 continues to rotate clockwise until reaching a termination point 112 wherein the major axis 108 of the elliptical shape is now generally horizontal. The complex, dimensionally varying axial trajectory of the hole 22 in the work piece 24 is not limited to the exemplary configuration shown in FIG. 10. FIG. 10 illustrates a non-elliptical, irregular hole 22' of a 2-lobed cam-like shape. FIG. 11 illustrates a multi-lobed shape of the hole 22." Those skilled in the art will appreciate that nearly endless variety of shapes can be produced using the subject spindle assembly 20 and the multiple input-multiple output control strategy of the controllers.

Figure 12:
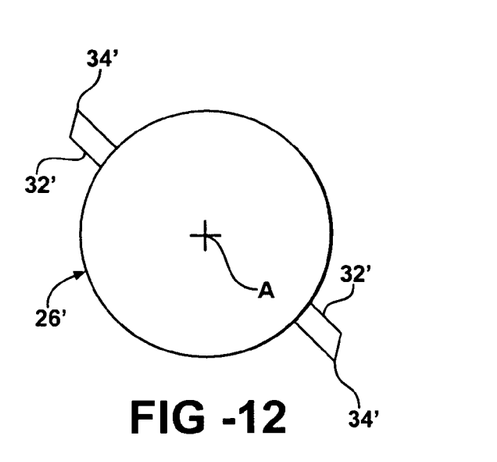
FIGS. 12 and 13 illustrate alternative shaping tool configurations.
Figure 13:
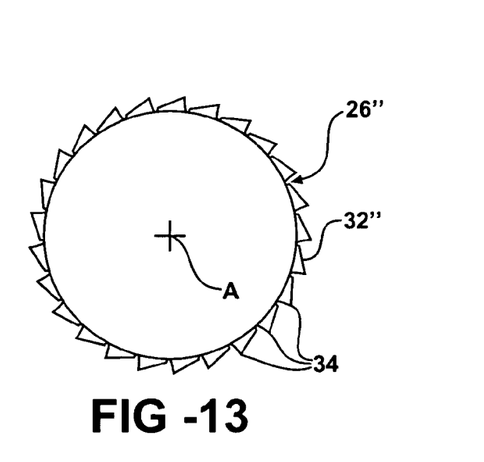

FIGS. 12 and 13 illustrate various alternative arrangements of the shaping tool 32' wherein two or more cutting edges 34' may be used. Alternatively, the cutting edge 34" may repeat continuously around the shaping end 30." In yet another embodiment, the cutting edge may take the form of a grinding disk or abrasive wheel (not shown).

Although the exemplary embodiments of this invention have been described in connection with hole formation in the more traditional sense, those skilled in the art will appreciate that these novel techniques can be carried out on an external surface. Thus, shaping of the non-circular surface can be carried out on an exterior surface with only straight-forward modifications to the shaping tool 34. Therefore, the invention contemplates a surface shaping methodology and device which can be used with equal effectiveness on holes and external features requiring non-round shapes with dimensionally varying trajectories.

Obviously, many modifications and variations of the present invention are possible in light of the above teachings. For example, using the above teachings in an inverse manner, it should be also possible to generate exceptionally round, highly cylindrical holes over relatively large axial travels. In a further example of the use of these teachings, the cutting tool can be replaced by a grinding tool thereby creating a novel precision grinder. It is, therefore, to be understood that the invention may be practiced otherwise than as specifically described.

What is claimed is:

1. A machine tool assembly of the type having a pitch-and-yaw adjusting spindle for forming high-precision surface contours on a work piece, said assembly comprising:
    a spindle defining a long axis and having a shaping tool extending from one end thereof, said spindle including a bearing journal;
    a journal box at least partially enveloping said bearing journal for rotatably supporting said spindle;
    a drive motor operatively interacting with said spindle for forcibly rotating said spindle about said long axis;
    at least one X-Y actuator for controlling pitch and yaw of said spindle to move said shaping tool in a non-circular orbital path; and
    said bearing journal and said journal box having concentric, generally spherical opposing surfaces centered about a center point intersecting said long axis of said spindle.

2. The assembly of claim 1, wherein said X-Y actuator comprises a magnetic bearing cluster including at least three magnet stators spaced about said long axis.

3. The assembly of claim 2, further including at least one position sensor for indicating the pitch and yaw of said spindle.

4. The assembly of claim 2, wherein said magnetic bearing cluster includes a pair of opposing X-coordinate magnet stators and a pair of opposing Y-coordinate magnet stators, said X-coordinate magnet stators spaced between and generally co-planar with said Y-coordinate magnet stators.

5. The assembly of claim 4, wherein said pair of opposing X-coordinate magnet stators and said pair of opposing Y-coordinate magnet stators disposed on respective opposite sides of said center point.

6. The assembly of claim 1, wherein said journal box comprises an air bearing for producing a pressurized cushion of air against said bearing journal.

7. The assembly of claim 6, wherein said journal box is porous.

8. The assembly of claim 1, wherein said drive motor comprises an air turbine.

9. The assembly of claim 8, wherein said air turbine includes an impeller disposed on said spindle and spaced from said bearing journal.

10. The assembly of claim 8, wherein said air turbine includes an impeller disposed on said bearing journal.

11. The assembly of claim 10, wherein said impeller is fabricated from a magnetically reactive material, said X-Y actuator comprising a magnetic bearing cluster including at least three magnet stators spaced proximate said impeller.

12. The assembly of claim 1, wherein said drive motor is contained within said journal box.

13. The assembly of claim 1, wherein said drive motor is disposed outside said journal box.

14. The assembly of claim 1, further including a rotary position sensor for determining the angular position of said shaping tool about said long axis.

15. The assembly of claim 1, wherein said shaping tool terminates in a plurality of point-like cutting edges disposed in generally equal accurate increments about said long axis.

16. The assembly of claim 1, wherein said bearing journal is centered upon the center of gravity of said spindle.

17. A method for rotating a high-speed spindle assembly to form an irregular hole with a dimensionally varying axial trajectory in a work piece, said method comprising the steps of:
    affixing a radially extending shaping tool to one end of a spindle having a long axis;
    supporting the spindle for rotation about the long axis;
    rotating the spindle about the long axis;
    creating a magnetic field influencing at least part of the rotating spindle;
    adjusting the yaw and pitch angulations of the long axis during rotation of the spindle by manipulating the magnetic field to thereby move the shaping tool in a predetermined non-circular orbital path;
    and said step of supporting the spindle for rotation about the long axis further including confining the spindle in a spherical bearing centered about a center point intersecting the long axis of the spindle.

18. The method of claim 17, wherein said step of supporting the spindle for rotation about the long axis further includes creating a cushion of air.

19. The method of claim 18, wherein said step of creating a cushion of air includes pumping air through a porous journal box.

20. The method of claim 17, wherein said step of rotating the spindle about the long axis includes turning an air turbine.

21. The method of claim 17, wherein said step of confining the spindle in a spherical bearing includes centering the spherical bearing upon the center of gravity of the spindle.

* * * * *